March 18, 1952  F. M. OWNER ET AL  2,589,853
AIRCRAFT POWER PLANT HAVING TWO OR MORE GAS TURBINE POWER UNITS
TO DRIVE ONE OR MORE AIRSCREWS IN VARIOUS COMBINATIONS
Filed March 21, 1947  2 SHEETS—SHEET 1
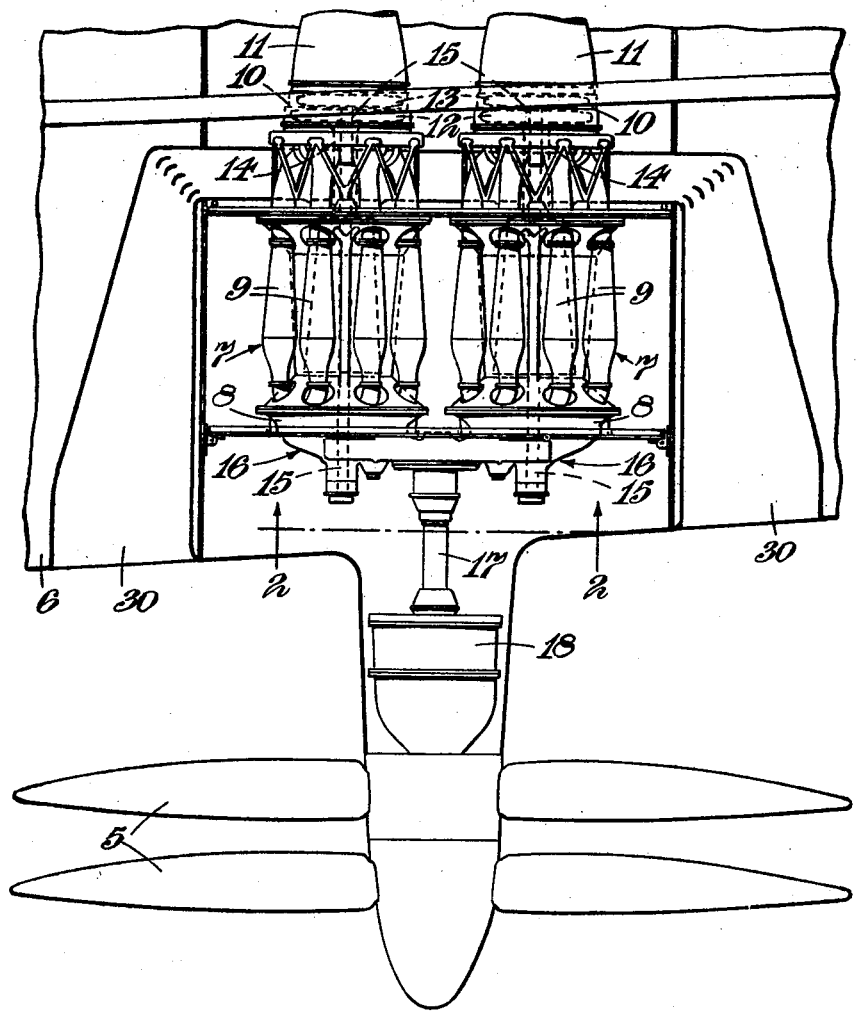
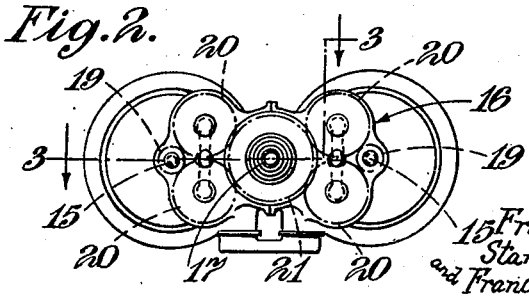
Inventors
Frank M. Owner
Stanley W. Mansell
and Francis C. I. Marchant
by Wilkinson & Mawhinney
Attorneys

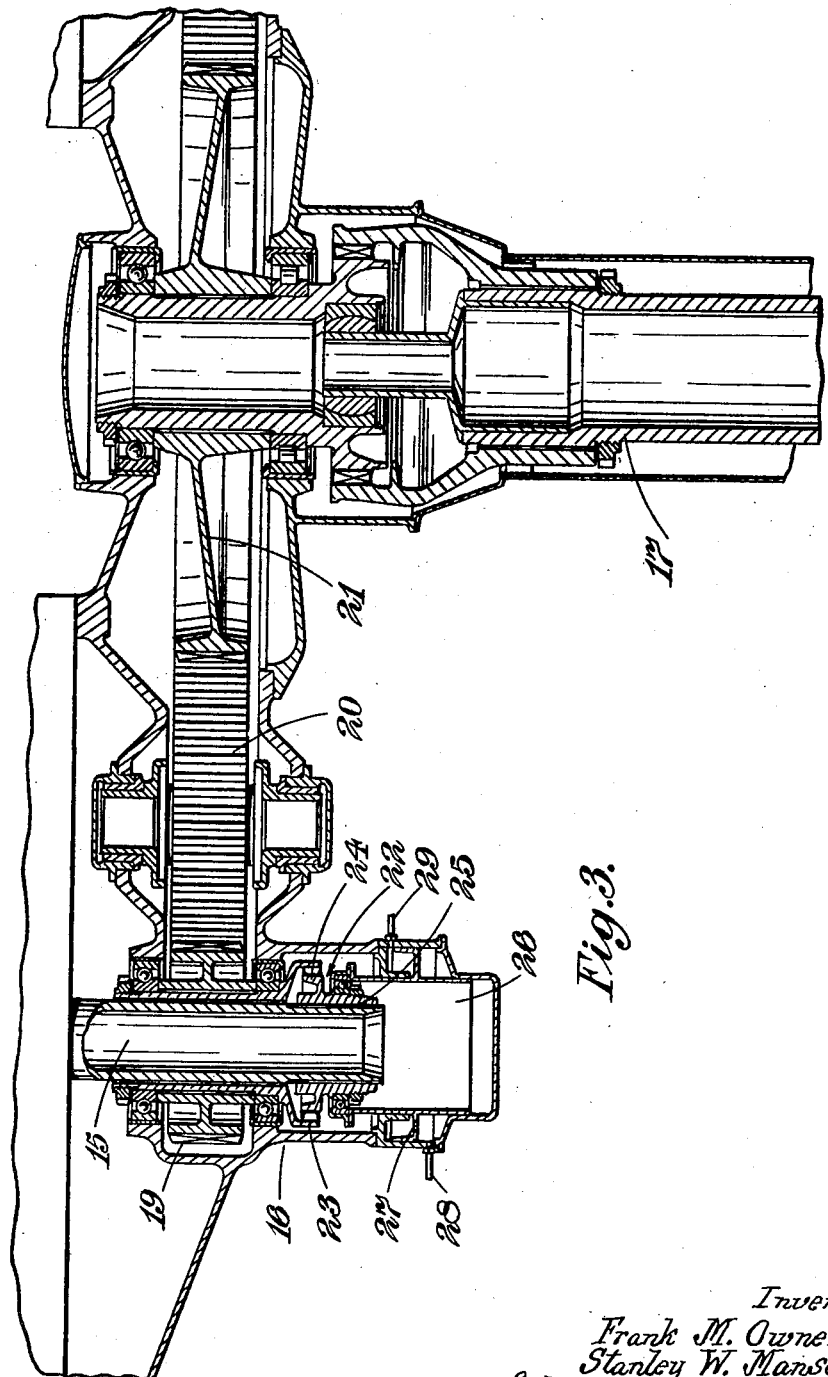

Patented Mar. 18, 1952

2,589,853

UNITED STATES PATENT OFFICE 2,589,853

AIRCRAFT POWER PLANT HAVING TWO OR MORE GAS TURBINE POWER UNITS TO DRIVE ONE OR MORE AIRSCREWS IN VARIOUS COMBINATIONS

Frank Morgan Owner, Stanley Walter Mansell, and Francis Charles Ivor Marchant, Bristol, England, assignors to The Bristol Aeroplane Company Limited, Bristol, England, a British company Application March 21, 1947, Serial No. 736,220
In Great Britain March 12, 1946

Section 1, Public Law 690, August 8, 1946
Patent expires March 12, 1966

3 Claims. (Cl. 60—39.21)

This invention concerns gas-turbine power plants (primarily for aircraft) and has for its object to provide an improved construction and arrangement enabling two or more power units to be used to drive one or more power output shafts (for instance, carrying airscrews) in various combinations.

According to the present invention a gas-turbine power plant comprises a plurality of power units each of which has a pair of independently rotating turbines, one (the compressor turbine) for driving the compressor of the power unit and the other (the power turbine) for driving the output shaft or shafts, the power turbines of said units being mechanically coupled together.

Preferably the power turbine of each unit is mechanically connected with a single power-output shaft for the power plant and there is provided between each turbine and said shaft means for connecting and disconnecting the former from the latter.

The connecting and disconnecting means may be manually controlled in its operation or may be automatically actuated.

An embodiment of the present invention (as applied to a power plant for an aeroplane) will now be described, by way of example, with reference to the accompanying drawings whereof:

Figure 1 is a view showing a part of the wing of an aeroplane having a power plant in accordance with this invention installed therein, Figure 2 is a section on the line 2—2 of Figure 1, and Figure 3 is a section on the line 3—3 of Figure 2 and to an enlarged scale for the sake of clearness.

As shown in Figure 1, the power plant is provided to drive counter-rotating airscrews 5 mounted on the leading-edge of the wing 6 within which the power plant lies. It will be understood that one power plant is installed in each wing of the aeroplane and that more than one such power plant may be so provided.

The power plant comprises a pair of gas-turbine power units 7 which are disposed side-by-side so that the long axis of each power unit lies chordwise of the wing.

Each power unit 7 comprises a compressor 8, a plurality of combustion chambers 9 to which the compressor delivers, a turbine assembly 10 through which the working medium passes from the chambers 9 and a jet pipe 11 which conveys the exhaust gas from the turbine to the trailing edge of wing 6.

The turbine assembly 10 comprises a pair of independently rotating turbines having rotors 12, 13 through which the working medium passes in succession. The rotor 12 is provided to drive the compressor 8 through shaft 14—it will, therefore, be referred to hereinafter as the "compressor turbine." The rotor 13 is provided to drive the airscrews 5 through shaft 15—it will, therefore, be referred to as the "power turbine."

The shafts 15 are each connected with the airscrews 5 by a first reduction gearing 16, a common transmission shaft 17 and a second reduction gearing 18. As shown in Figures 2 and 3 each shaft 15 carries a pinion 19 which drives a pair of idlers 20 that mesh with a gear wheel 21 connected to shaft 17. Reduction gearing 16 for each power unit comprises pinion 19, idlers 20 and wheel 21.

Each reduction gearing 16 incorporates a clutch, generally indicated by the reference numeral 22 in Figure 3, by which the pinion 19 may be coupled to, and uncoupled from, its shaft 15.

The clutch 22 comprises an internally toothed member 23 which carries pinion 19 and a toothed element 24 mounted on shaft 15 by splines 25 so that the element is movable axially of shaft 15 into, and out of, engagement with member 23.

The said movements of element 24 are effected by a hydraulic motor 26 which is built into the casing of gearing 16. The ram 27 of motor 26 is coupled to element 24 so that admission of pressure fluid to the lower end of the motor by pipe 28 advances ram 27 and element 24 so that the latter engages member 23 and shaft 15 drives pinion 19. Similarly, pressure fluid entering motor 26 by pipe 29 moves element 24 to disengage member 23. Each clutch 22 is hydraulically operated, as described, at the will of the pilot.

With the arrangement described either or both power units 7 may be used to drive the counter-rotating airscrews 5, the power unit being put out of use when desired by the pilot upon the actuation of the associated clutch 22. In the event that one of the power units 7 becomes inoperative the pilot may disconnect it from the airscrews 5, but in the event, however, that this is not possible or desirable, the power absorbed by the inoperative power unit will be small since it is only that required to drive the power turbine 13 and its associated shafting, since the compressor 8 is independently driven by its associated turbine 12.

An advantage of the present invention is that under cruising conditions the airscrews 5 may be driven from a single power unit 7 and that under emergency or take-off conditions the total power of the power plant is readily available.

The power plant and the transmission gearing to the airscrews lie wholly within the wing, thereby reducing the drag losses to a minimum.

Although the invention has been described above as applied to a power plant for an aeroplane it is to be understood that the invention is not so limited. A power plant in accordance with this invention may be installed in boats, in land vehicles, such as locomotives, or be used in stationary installations.

We claim:

1. A gas turbine power plant comprising a plurality of power units each having a compressor, a turbine rotor to drive the compressor, a power shaft mounted for rotation independently of the compressor turbine rotor, and independently rotating turbine rotor to drive said power shaft, combustion equipment supplied with air from the compressor and delivering combustion gases successively to the turbine rotors, a driving shaft common to the power rotors of the turbines and driven thereby, a clutch to connect each power shaft with the common driving shaft and means for actuating each clutch independently.

2. A gas turbine power plant for driving an aeroplane propeller comprising a plurality of power units each having a compressor, a turbine rotor to drive the compressor, a power shaft mounted for rotation independently of the compressor turbine rotor, an independently rotating turbine rotor to drive said power shaft, combustion equipment supplied with air from the compressor and delivering combustion gases successively to the turbine rotors, a propeller shaft common to the power rotors of the turbines and driven thereby, a clutch to connect each power shaft with the propeller shaft, an hydraulic motor to engage and disengage each clutch and manual means for independently actuating each hydraulic motor.

3. The combination of a rotary propeller, a follower shaft in driving relation to said propeller, a plurality of separate and independent drive shafts all geared to drive said follower shaft, a plurality of separate and independent clutches, one between each drive shaft and the follower shaft, a plurality of separate and independent controls for clutching and declutching at will the follower shaft to or from any of said drive shafts to selectively suspend counter drive of any of said drive shafts from the follower shaft while continuing to drive the follower shaft from any of the other drive shafts whereby to permit the declutched drive shaft to come to rest, separate power turbines one each connected to drive a respective drive shaft, separate combustion equipment for supplying motive fluid to drive said power turbines, separate compressors for delivering air under pressure to the respective combustion equipment, and separate compressor turbines, unconnected with said power turbines or said drive shafts but positioned with said power turbines to be driven by the motive fluid from the respective combustion equipment whereby counter drive from the follower shaft to a drive shaft will not entrain the respective compressor or its compressor turbine.

FRANK MORGAN OWNER.
STANLEY WALTER MANSELL.
FRANCIS CHARLES IVOR MARCHANT.

REFERENCES CITED

The following references are of record in the file of this patent:

UNITED STATES PATENTS

| Number | Name | Date |
|---|---|---|
| 1,953,486 | Kiep | Apr. 3, 1934 |
| 2,073,191 | Belluzzo | Mar. 9, 1937 |
| 2,123,219 | Waseige | July 12, 1938 |
| 2,243,467 | Jendrassik | May 27, 1941 |
| 2,288,173 | Wohanka | June 30, 1942 |
| 2,305,454 | Nallinger | Dec. 15, 1942 |
| 2,380,889 | Waseige | July 31, 1945 |
| 2,399,046 | Larrecq | Apr. 23, 1946 |
| 2,428,457 | Hines | Oct. 7, 1947 |
| 2,464,986 | Miller | Mar. 22, 1949 |
| 2,476,179 | Cameron | July 12, 1949 |